US009321957B2

(12) United States Patent
Menge

(10) Patent No.: US 9,321,957 B2
(45) Date of Patent: Apr. 26, 2016

(54) SCINTILLATOR AND RADIATION DETECTOR INCLUDING THE SCINTILLATOR

(71) Applicant: Saint-Gobain Ceramics & Plastics, Inc., Worcester, MA (US)

(72) Inventor: Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/484,428

(22) Filed: Sep. 12, 2014

(65) Prior Publication Data

US 2015/0076360 A1    Mar. 19, 2015

Related U.S. Application Data

(60) Provisional application No. 61/878,449, filed on Sep. 16, 2013.

(51) Int. Cl.

| | |
|---|---|
| *G01T 3/06* | (2006.01) |
| *C09K 11/06* | (2006.01) |
| *C08K 3/32* | (2006.01) |
| *G01T 1/20* | (2006.01) |
| *G01T 1/203* | (2006.01) |

(52) U.S. Cl.
CPC . *C09K 11/06* (2013.01); *C08K 3/32* (2013.01); *G01T 1/20* (2013.01); *G01T 1/203* (2013.01); *G01T 3/06* (2013.01)

(58) Field of Classification Search
CPC .............. G01T 3/06; G01T 1/20; G01T 1/203
See application file for complete search history.

(56) References Cited

U.S. PATENT DOCUMENTS 5,100,580 A * 3/1992 Powell et al. ............. 252/301.35
5,587,112 A * 12/1996 Kauffman et al. ............. 252/589

(Continued)

FOREIGN PATENT DOCUMENTS

| GB | 2482024 A | * 1/2012 | ............. G01T 1/203 |
|---|---|---|---|
| WO | 2011060085 A2 | 5/2011 | |
| WO | 2012142365 A2 | 10/2012 | |

OTHER PUBLICATIONS

B. D'Andrade, "Molecules that convert heat into light," Dec. 2012, Nature, Nol. 492 p. 197.*

(Continued)

*Primary Examiner* — Kiho Kim
(74) *Attorney, Agent, or Firm* — Abel Law Group, LLP; Robert N Young

(57) ABSTRACT

A radiation detector can include a solid organic/plastic scintillator that enables neutron and gamma interactions to be readily distinguished via pulse-shape discrimination. Embodiments make use of a scintillator including a polymer matrix with a dispersed scintillation material exhibiting thermally activated delayed fluorescence. The scintillation material can include an organic luminescent material that is free of heavy metals and in which excited triplet states are efficiently promoted into excited singlet states by thermal energy, the excited singlet states then generating a delayed fluorescence when decaying to ground state. As a result, the scintillation material, when exposed to ionizing radiation, can produce a combination of prompt and delayed fluorescence sufficient to enable neutron and gamma interactions to be readily distinguished via pulse-shape discrimination techniques.

20 Claims, 4 Drawing Sheets

(56) References Cited

U.S. PATENT DOCUMENTS

| | | | |
|---|---|---|---|
| 7,462,897 | B2 | 12/2008 | Endo |
| 8,263,971 | B2 | 9/2012 | Pieh |
| 2004/0104500 | A1* | 6/2004 | Bross et al. ............... 264/85 |
| 2008/0237470 | A1* | 10/2008 | Loureiro et al. ......... 250/361 R |
| 2011/0108738 | A1 | 5/2011 | Doty et al. |
| 2011/0266451 | A1* | 11/2011 | Achtzehn et al. ............ 250/362 |
| 2012/0241630 | A1 | 9/2012 | Walker et al. |

OTHER PUBLICATIONS

Detert et al., "Star-shaped conjugated systems," 2010, Materials, vol. 3, pp. 3218-3330.*

Musonza, Emmanuel Tapiwa et al., "Measurement of Fluence at the D-line Fast Neutron Facility at iThemba LABS," Department of Physics, Faculty of Science, University of Cape Town, Aug. 2011, 125 pages.

International Search Report and Written Opinion for PCT/US2014/055331, dated Dec. 16, 2014, 13 pages.

Doty, F. Patrick et al., "Use of Metal Organic Fluors for Spectral Discrimination of Neutrons and Gammas," Sandia National Laboratories, SAND2010-6724, Unlimited Release, 2010, 26 pages.

Feng, Patrick L. et al., "Spectral- and Pulse-Shape Discrimination in Triplet-Harvesting Plastics Scintillators," IEEE Transactions on Nuclear Science, vol. 59, No. 6, Dec. 2012, pp. 3312-3319.

Uoyama, Hiroki et al., "Highly Efficient Organic Light-Emitting Diodes From Delayed Fluorescence," Nature, Macmillan Publishers Limited, vol. 492, Dec. 13, 2012, 7 pages.

Blanc, Pauline et al., "Intrinsic Evaluation of n/y Discrimination in Plastic Scintillators," IEEE Transactions on Nuclear Science, vol. 61, No, 4, dated Aug. 2014, pp. 1995-2005.

Budakovsky, Sergey V. et al., "New Effective Organic Scintillators for Fast Neutron and Short-Range Radiation Detection,"IEEE Transactions on Nuclear Science, Vol, 54, No. 6, dated Dec. 2007, pp. 2734-2740.

Campbell, I. H. et al,, "Efficient Plastic Scintillators Utilizing Phosphorescent Dopants," Applied Physics Letters, vol. 90, dated 2007, pp. 012117-1 through 012117-3.

Winyard, R. A, et al., "Pulse Shape Discrimination in Inorganic and Organic Scintillators," Nuclear Instruments and Methods, vol. 95, dated 1971, pp. 141-153.

Zaitseva, Natalia et al., "Plastic Scintillators with Efficient Neutron/Gamma Pulse Shape Discrimination," Nuclear Instruments and Methods in Physics Research A, 668, dated 2012, pp. 88-93.

* cited by examiner

SCINTILLATOR AND RADIATION DETECTOR INCLUDING THE SCINTILLATOR

CROSS-REFERENCE TO RELATED APPLICATION

This application claims priority under 35 U.S.C. §119(e) to U.S. Provisional Application No. 61/878,449 entitled "Scintillation Detector," by Peter R. Menge, filed on Sep. 16, 2013. The above-referenced application is assigned to the current assignee hereof and is incorporated herein by reference in its entirety.

FIELD OF THE DISCLOSURE

The present disclosure is directed to scintillators and neutron detectors, particularly neutron detectors including a solid organic scintillator.

BACKGROUND

Neutron detectors are used in a variety of applications, such as physics research, geophysical applications, security screening, military applications, or the like. Typical neutron detectors make use of scintillators, which are materials that emit light upon interaction with radiation particles. The light passes to a photodetector device, such as a photomultiplier tube, which converts the photons (light) emitted from the scintillator into electrical pulses. The electrical pulses can be processed by associated electronics and may be registered as counts that are transmitted to analyzing equipment.

Helium-3 neutron detectors are the accepted standard in neutron detectors. Unfortunately, however, the availability of $^3$He is very limited when compared to the worldwide demand.

Organic scintillators in the form of solid, machinable plastic materials are widely available and have a number of significant advantages in terms of cost, performance, and the ease at which plastic scintillators can be shaped, through the use of molds or other means, into virtually any desired shape or size. Unfortunately, however, detectors using plastic scintillators tend to have a much greater response to gamma rays than $^3$He neutron detectors. A higher sensitivity to gamma rays can result in too many false positive counts where a gamma ray interaction is incorrectly identified as a neutron interaction. Because the presence of neutrons typically indicates the presence of fissile materials while gamma rays can be emitted from non-fissile, but naturally radioactive materials, the ability to accurately distinguish between the two types of particles is critical for security and nuclear safety applications.

A variety of pulse-shape-discrimination (PSD) techniques have been developed to distinguish between neutron and gamma events for certain types of detectors. But while these techniques work well for liquid organic scintillators, PSD has been difficult or even impossible to use for solid organic (plastic) scintillators.

Accordingly, further improvement of neutron detectors, particularly neutron detectors using solid organic scintillators, is desired.

SUMMARY OF THE INVENTION

Embodiments of the invention provide an improved radiation detector using a solid organic/plastic scintillator that enables neutron and gamma interactions to be readily distinguished via pulse-shape discrimination (PSD). As described herein, a preferred radiation detection apparatus can include a polymer matrix with a dispersed scintillation material exhibiting thermally activated delayed fluorescence (TADF). The scintillation material comprises an organic luminescent material that is free of heavy metals and in which excited triplet states are efficiently promoted into excited singlet states by thermal energy, the excited singlet states then generating a delayed fluorescence when decaying to ground state. As a result, the scintillation material, when exposed to ionizing radiation, produces a combination of prompt and delayed fluorescence sufficient to enable neutron and gamma interactions to be readily distinguished via PSD techniques.

The foregoing has outlined rather broadly the features and technical advantages of embodiments of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the concepts as described herein. It should also be realized by those skilled in the art that such equivalent constructions do not depart from the spirit and scope of the invention as set forth in the appended claims.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Organic scintillators in the form of solid, machinable plastic materials are widely available and have a number of significant advantages in terms of cost, performance, and the ease at which plastic scintillators can be shaped, through the use of molds or other means, into virtually any desired shape or size. Unlike helium-3 neutron detectors, however, organic scintillators, are sensitive to both neutron and gamma interactions. Further, pulse-shape discrimination (PSD), which allows neutron and gamma interactions to be distinguished in some type of scintillators, has been difficult or even impossible to use for solid organic (plastic) scintillators.

Although a variety of different PSD techniques are known, the basis for all types of PSD used with scintillation detectors is the fraction of prompt fluorescence and delayed fluorescence light produced by a given radiation type. Neutron and heavy charged particle interactions supply more energy over a shorter distance than interactions with free electrons produced by gamma rays. This results in many more triplet excitations for neutron interactions than for gamma ray interactions, which means that gamma-ray scintillation pulses will decay noticeably faster than neutron-scintillation pulses. For this reason, a measure of the magnitude of the slow (delayed fluorescence) component of the scintillation pulse can be used to identify the type of radiation producing light in the scintillator.

A significant problem with typical organic scintillators, especially solid plastic scintillators, is that these types of scintillation often do not exhibit a sufficient delayed fluorescence component for traditional PSD techniques to be employed. Organic scintillators emit light upon the absorption of ionizing radiation primarily by way of fluorescence.

Figure 1A:
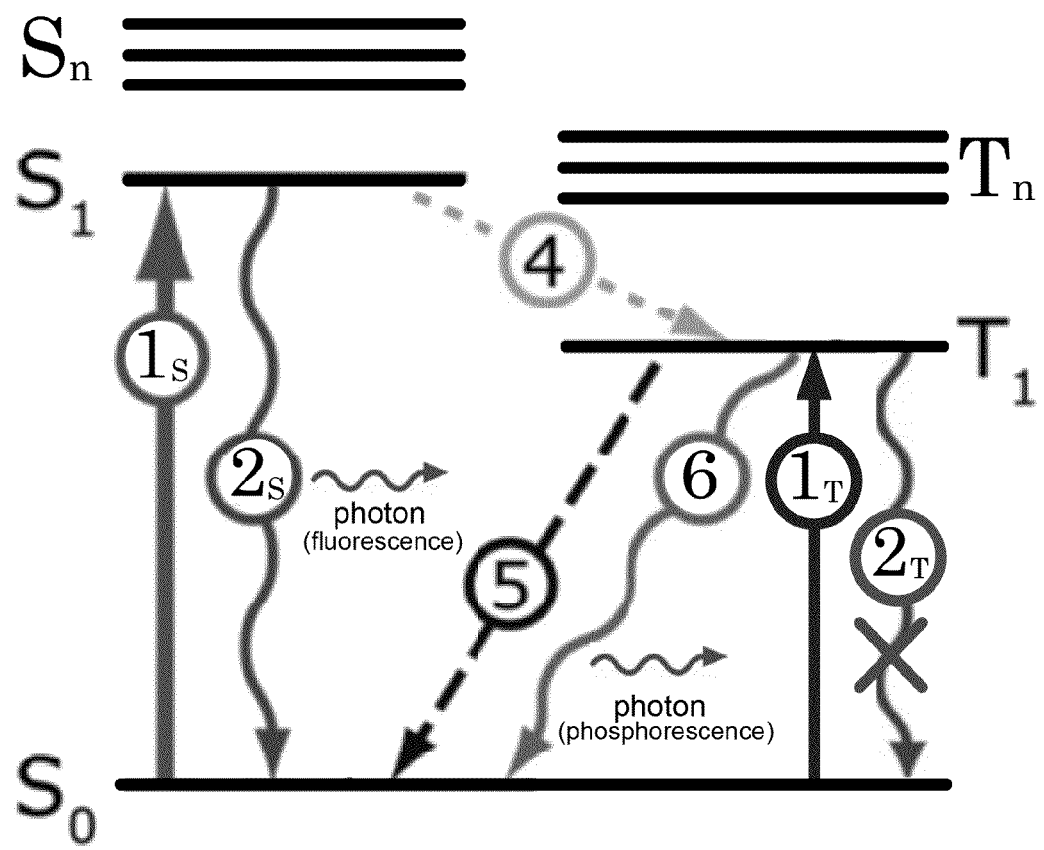
FIG. 1A is a Jablonski diagram showing relevant transitions experienced by excited electrons.

FIG. 1A is a Jablonski diagram showing relevant transitions experienced by excited electrons, with the energies of the singlet (S0 and S1) and triplet (T1 and Tn) states scaled vertically. When energy is deposited in a system via an interaction with ionizing radiation, it can be transferred to pi-electrons, which "excites" the electrons to a number of different singlet ($S_1$) and triplet ($T_1$) states through energy absorption (lines $1_S$ and $1_T$). In singlet states, the excited electron is paired with a ground state electron having an opposite spin, which results in a total spin of zero. Electrons excited to the singlet ($S_1$) state will quickly relax to ground state ($S_0$) by the emission of a photon (line $2_S$). This process ($S_1 \rightarrow S_0$) typically occurs with nanoseconds and is considered the "fast" light emission component referred to as prompt fluorescence ("PF").

Other electrons are excited to one of three triplet states (line $1_T$) where the excited electron is not paired and the total spin will equal one. These triplet states are always at a lower energy level than their corresponding singlet states. In typical organic (plastic) scintillator materials, the decay of excited electrons in triplet states to ground state ($T_1 \rightarrow S_0$) is "spin forbidden" (line $2_T$). The great majority of excited electrons in the triplet state will undergo a non-radiative thermal decay to ground state (line 5) that does not result in the emission of photons. Because approximately 25% of the excited electrons will be in a singlet state, while 75% will be in a triplet state, most of the excited electrons do not contribute to prompt fluorescence in plastic scintillators. This limits the internal quantum efficiency of typical plastic scintillators to 25%.

Luminescent materials incorporating organo-metallic compounds from the iridium-ppy or platinum octaethylporphyrin families are known to exhibit strong spin-orbit coupling that facilitates phosphorescence from the normally non-radiative triplet states. The use of such compounds allows the internal quantum efficiency of the luminescence to approach 100% and the phosphorescence, one of the slowest forms of decay for energetic electrons, has been used to enable PSD in scintillation detectors. Unfortunately, however, these organo-metallic compounds are expensive, and the phosphorescent light produced is at wavelengths detected less efficiently in photomultiplier tubes.

It is also possible for some organic scintillators to emit light through a mechanism referred to as delayed fluorescence ("DF"). In delayed fluorescence, electrons in the triplet state, instead of decaying to ground state, are instead further excited to a singlet state by imparting additional energy to the triplet electrons. The singlet electrons then decay to ground state through the emission of photons ($T_1 \rightarrow S_1 \rightarrow S_0$). Typically, this process occurs when two electrons are excited to a triplet state. These excited electrons interact collisionally and one electron is returned to the ground state while the other is returned to a singlet state, which then decays to the ground state. Photon emission that involves this process of triplet-triplet annihilation is referred to as P-type emission, so-named because it can be seen in pyrene derivatives. The internal quantum efficiency of an organic scintillator making efficient use of triplet-triplet annihilation is limited to 62.5%.

As discussed above, the use of PSD to distinguish between neutron and gamma events depends upon the fraction of prompt fluorescence and delayed fluorescence produced by a given radiation type. That is to say, different radiation types must produce pulses of differently shaped pulse amplitude profiles in terms of current from the anode of the PMT vs. time in order for the different radiation types to be distinguished. For plastic scintillation materials where the triplet electrons decay thermally and do not give off photons, substantially all of the detector signal will result from the decay of the $S_1$ electrons. As a result, neutron and gamma interactions will be indistinguishable.

Even for organic scintillation materials where some degree of delayed fluorescence is observed, the fluorescence resulting from the repopulation of $S_1$ following T-T annihilation is not very efficient, and relies on mobile triplet states. Because the triplet sites must interact with each other for the T-T annihilation to occur, only materials with high triplet mobility will be useful for pulse shape discrimination, such aromatic liquid scintillators, which raise safety concerns and are difficult to use, and organic single crystals, which can be fragile and difficult to produce in very large volumes. Typical solid plastic/organic scintillators simply do not exhibit sufficient delayed fluorescence resulting from T-T annihilation to easily distinguish between neutron and gamma events.

Figure 1B:
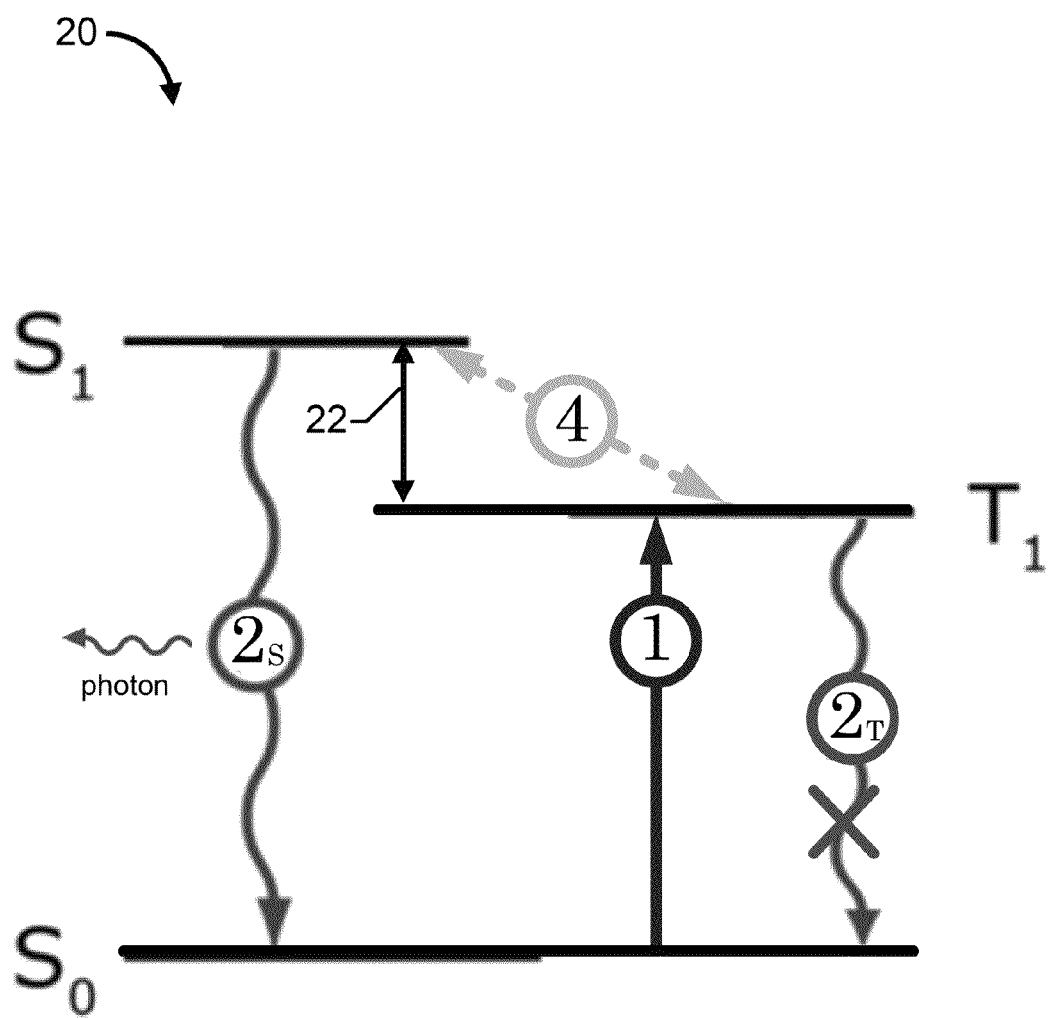
FIG. 1B is a Jablonski diagram showing transition of triplet electrons according to embodiments of the invention.

Embodiments of the invention are directed at a novel organic/plastic scintillator that enables neutron and gamma interactions to be readily distinguished via PSD techniques. Applicants have realized, however, that there are certain compounds that display a different type of delayed fluorescence. As illustrated in FIG. 1B, thermally activated delayed fluorescence (TADF), referred to as E-type delayed fluorescence, occurs when an electron is excited to a triplet state (1) and is then up-converted by thermal energy to the excited singlet ($S_1$) state (4). Once in the excited singlet state, the electron can then decay to ground state through the release of a photon (2). TADF does not require the interaction of triplet states as in T-T annihilation described above.

TADF is directly proportional to the energy gap between the singlet ($S_1$) and triplet ($T_1$) states ($\Delta E_{ST}$). For most luminescent materials, the $S_1$ is considerably higher in energy than the $T_1$ state, with most materials having a $\Delta E_{ST}$ of 0.5 to 1.0 eV, which is more than an order of magnitude greater than the thermal energy per particle at room temperature. As a result, TADF is negligible for most materials.

Figure 2:
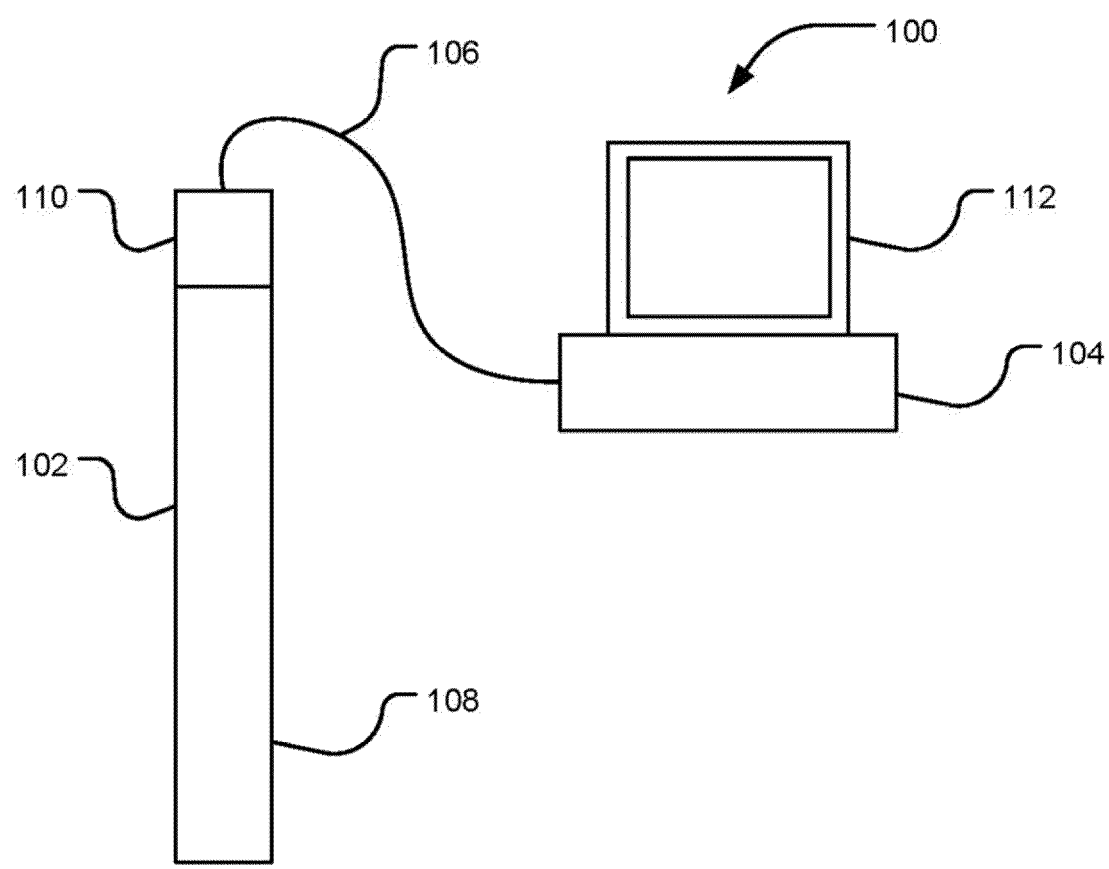
FIG. 2 is a schematic depiction of an embodiment of a neutron detector in accordance with embodiments described herein.

In the embodiment illustrated in FIG. 2, a neutron detection apparatus 100 can include a neutron sensor 102 and a photo-sensor 110. The neutron detection apparatus can be a medical imaging apparatus, a well logging apparatus, a security inspection apparatus, or the like. In a particular embodiment, the neutron detection apparatus 100 is used for neutron detection (for example, thermal neutrons and fast neutrons), and may also be used to detect gamma rays, other targeted radiation, or any combination thereof. As discussed in greater detail below, detection of thermal neutrons typically involves the interaction of the thermal (slow) neutrons with a neutron-sensitive material such as isotopes of lithium ($^6Li$), and boron ($^{10}$B). This interaction produces heavy charged particles that are themselves detected. Thus, as used herein, neutron detection will include detection of these heavy charged particles.

As described below, the neutron sensor 102 can comprise a scintillator 108, which can be housed within a casing (not shown). The photosensor 110 is preferably optically coupled to the scintillator and operative to convert photons emitted by the scintillator into an electronic signal pulse. The optical coupling between the scintillator and the photosensor can be accomplished, for example, by a light pipe or optical fibers between the scintillator and photosensor. In some embodiments, the optical coupling can also be used to change the wavelength of the scintillating light.

When in the presence of a radiation source, the scintillator 108 can produce scintillating light in response to interaction with radiation. The light (photons) emitted by the scintillating material are detected by the photon sensor 110 and converted to pulse data that is transmitted via the communications interface 106 to the computational circuitry 104. The computational circuitry 104 can receive and analyze the pulse data, including subjecting pulse data to PSD to distinguish between pulses corresponding to neutrons and pulses corresponding to gamma rays. Further, the computational circuitry 104 can provide an indication of the number of neutron events or an indication of a level of neutron radiation via an interface 112. Preferably, embodiments of the invention will be able to distinguish pulses corresponding to neutrons and pulses corresponding to gamma rays so that there is no more than one false positive per million gamma ray interactions.

The scintillator 108 can be configured to produce a light in response to receiving a target radiation, such as a neutron, gamma radiation, other target radiation, or any combination thereof, and to produce scintillation light in response to receiving the target radiation. The light produced by scintillator 108 can include visible light or other radiation (such as ultraviolet radiation).

Scintillator 108 can include a plurality of components. For example, scintillator 108 can include a neutron-sensing compound dispersed or dissolved within a sold material such as an organic or polymer matrix. The polymer matrix can include a vinyl toluene, a polyvinyl toluene, a styrene, polystyrene, a methyl methacrylate, a polymethylmethacrylate, or any combination thereof. The polymer matrix is preferably substantially transparent to the wavelength of light emitted by the scintillating materials incorporated into the scintillator. As used herein, a polymer matrix will be defined as transparent if it has a transmission of greater than 80% of the wavelength of light emitted by the scintillating materials.

The neutron-sensing compound can be incorporated into the polymer matrix by way of any suitable mechanism. In a specific example, a desired liquid plastic base (e.g., styrene, vinyl toluene, or methyl methacrylate) can be distilled at about 150° F. Particles of the neutron-sensing compound (the fluor) are added to the liquid plastic base and dispersed throughout, preferably in a substantially uniform manner. As used herein, the addition of the neutron-sensing compound to the liquid plastic base can be referred to as doping. The fluor and plastic mixture can then be added to a mold and heated (for example, at about 140° to 160° F. for 1-3 days) to polymerize the plastic base. The polymerization of the liquid plastic base can occur at a rate sufficient to substantially prevent the particles of the neutron-sensing compound from settling out of the liquid, ensuring the neutron-sensing compound is substantially dispersed throughout the polymer matrix. The mixture of the liquid plastic base and the neutron-sensing compound can be poured into a mold prior to polymerization to provide the polymer matrix with a desired shape of the scintillation material. Additionally, the scintillation material can be shaped, such as by cutting to a desired size. The result is a solid plastic scintillator with the neutron-sensing compound dispersed within the polymer matrix.

Of course, other arrangements of fluor and polymer matrix may be utilized without departing from the scope of the present invention. For example, scintillator 108 can include a plurality of different scintillating materials. Further, the above fabrication methodology is provided only by way of example, and organic plastic scintillators according to embodiments of the present invention may be fabricated under similar conditions, but with variations in temperature, incubation time, amount of respective components, etc., as would be understood by a skilled artisan reading the present descriptions.

In preferred embodiments, at least one scintillating material included in scintillator 108 is a neutron-sensing compound comprising an organic luminescent material that is free of heavy metals and in which excited triplet states are efficiently promoted into excited singlet states by thermal energy, the excited singlet states then generating luminescence when decaying to ground state. When exposed to ionizing radiation, a neutron-sensing compound according to an embodiment of the present invention produces a combination of prompt and delayed fluorescence. Energy deposited into the luminescent material excites electrons to the singlet and triplet states as discussed above. Electrons excited to the singlet (S1) state will quickly relax to ground state (S0) by the emission of a photon. This process (S1→S0) typically occurs with nanoseconds and is considered the "fast" light emission component referred to as prompt fluorescence ("PF"). Because the decay of excited electrons in triplet states to ground state (T1 →S0) is "spin forbidden," the excited electrons in the triplet state will not contribute to prompt fluorescence.

Preferred neutron-sensing compounds, however, have an energy gap between the singlet and triplet states that is low enough that environmental thermal energy is sufficient to cause reverse intersystem crossing from the triplet state (T1) to the singlet state (S1). This reverse intersystem crossing serves to repopulate the S1 state, which was depleted by the decay of the original S1 electrons via prompt fluorescence. The repopulated S1 electrons will then likewise decay to ground by the emission of a photon, resulting in delayed fluorescence. Preferably, this TADF occurs readily at temperatures below 100° C., below 50° C., or even below 25° C.

The delayed fluorescence (resulting from the harvesting of triplet states) has a significantly longer emission lifetime that the initial prompt fluorescence. This difference between the fraction of prompt fluorescence and delayed fluorescence light produced by a given radiation type is the basis for distinguishing neutron interactions from gamma ray interactions using traditional pulse shape discrimination (PSD) techniques. That is to say, different radiation types will produce pulses of differently shaped pulse amplitude profiles in terms of current from the anode of the photodetector vs. time. Because a higher number of triplets are produced by neutron interactions than by gamma interactions, the delayed fluorescence resulting from neutron interactions will be much greater than the delayed fluorescence (if any) resulting from gamma interactions. For example, the decay time for gamma-ray interactions will typically be on the order of 100 ns, whereas for neutron interactions the decay time is almost a microsecond.

Embodiments of the present invention make use of a scintillator including a polymer matrix with a dispersed scintillation material exhibiting E-type delayed fluorescence and having a $\Delta E_{ST}$ sufficiently small to allow for efficient TADF at operational temperatures, preferably at room temperatures (for example, from 20 to 25° C.). In preferred embodiments, the scintillation material has an energy gap ($\Delta E_{ST}$) between the excited triplet state ($T_1$) and the excited singlet state ($S_1$) than is no more than about 600 meV, no more than about 500 meV, no more than about 400 meV, no more than about 300 meV, no more than about 200 meV, or no more than about 100 meV.

Further, because $\Delta E_{ST}$ is proportional to the exchange energy between the highest occupied molecular orbital (HOMO) and the lowest unoccupied molecular orbital (LUMO) in a molecule, a smaller $\Delta E_{ST}$ can be achieved by increasing the separation between the HOMO and the LUMO in a preferred scintillation material. This occurs because the exchange energy decreases exponentially with increasing HOMO-LUMO (electron-hole) separation distance. In preferred embodiments, the HOMO and LUMO are localized on donor and acceptor moieties, respectively, which provides for increased separation. Additionally, in some embodiments, steric hindrance between the donor and acceptor moieties causes a further increase in spatial separation between the HOMO and LUMO, leading to a small $\Delta E_{ST}$ and enhanced TADF.

Because embodiments of the present invention harvest the electrons in the triplet state to produce fluorescence, the internal fluorescence efficiency of preferred scintillation materials described herein is not limited to 25% or even 62.5% as in the prior art methods described above. Instead, embodiments of the present invention are capable of internal efficiencies approaching or even reaching 100%. Preferred embodiments are directed at solid organic/plastic non-crystalline scintillators having an internal fluorescence efficiency that is greater than about 25%, greater than about 62.5%, greater than about 70%, greater than about 80%, greater than about 90%, greater than about 95%, greater than about 98%, or even an internal fluorescence efficiency of about 100%.

In preferred embodiments, neutron-sensing compounds comprise one or more carbazole moieties that can act as a donor chromophore. As known by persons of skill in the art, a carbazole is an aromatic heterocyclic organic compound having a tricyclic structure and consisting of two six-membered benzene rings fused on either side of a five-membered nitrogen-containing ring. Other suitable compounds that can act as a donor chromophore include indolocarbazole, plenylindolocarbazole, a heteroatom substituted carbazole, dibenzothiophene, diphenylsulfone, or phenoxazine. Suitable acceptor chromophores include compounds comprising one or more dicyanobenzene or triazine moieties. In one preferred embodiment of the present invention, the metal-free organic luminescent compound comprises a carbazolyl dicyanobenzene compound such as 1,2,3,4-tetrakis(carbazol-9-yl)-5,6-dicyanobenzene (4CzPN) or 1,4-dicyano-2,3,5,6-tetrakis(3,6-dimethylcarbazol-9-yl)benzene (4CzTPN-Me). The luminescence produced via TADF using the neutron-sensing compounds described above will have an intensity proportional to the concentration of the neutron-sensing compound and can thus be controlled through doping.

In some embodiments, the scintillator can also include a second neutron responsive material suitable for detecting thermal neutrons. Thermal neutrons can interact with, and be "captured" by a few nuclei whose capture cross sections are high. Such nuclei include, but are not limited to, the well-known isotopes of lithium ($^6$Li), and boron ($^{10}$B). A preferred second neutron responsive material can emit highly ionizing nuclear fragments, such as a positively charged particle, in response to absorbing a neutron. The positively charged particle can include an alpha particle, a triton particle, a deuteron particle, a $^7$Li nucleus, or any combination thereof. The second neutron responsive material can surround the plastic scintillator, be dispersed within the polymer matrix, or be present in any other suitable form.

Embodiments of the invention thus provide an organic scintillator as described above that allows neutron and gamma interactions to be distinguished by pulse shape discrimination methods. Referring again to FIG. 2, photosensor 110 can receive the scintillating light (including both prompt and delayed fluorescence) or a derivative thereof, such as wavelength shifted light, and generate an electronic signal, such as an electronic pulse, in response to the scintillating light or its derivative. The photosensor 110 can be photomultiplier tubes ("PMTs"), semiconductor-based photomultipliers, a hybrid photomultiplier, a photodiode, or another suitable devices that generates an electronic pulse in response to the scintillating light. The electronic pulse from the photosensor 110 can be transmitted to computational circuitry 104.

The computational circuitry 104 can include one or more amplifiers, discriminators (such as a pulse shape discriminator), analog-to-digital signal converters, photon counters, other electronic components, or any combination thereof. The computational circuitry 104 can be configured to detect particular radiation or detect more than one type of radiation. For example, the computational circuitry 104 could include a pulse discriminator to process an electronic signal pulse to identify the pulse as either a non-neutron pulse or a neutron pulse. (As used herein, a neutron pulse will also include pulses resulting from heavy charged particles produced by the interaction of thermal neutrons with neutron-sensitive materials as discussed above.) The pulse-shape discriminator can be configured to apply a pulse-shape discrimination algorithm, the pulse-shape discrimination algorithm being capable of identifying each pulse as either resulting from radiation other than neutron radiation (a non-neutron pulse) or a pulse resulting from neutron radiation (a neutron pulse) based upon the decay time of the pulse. In some embodiments, the pulse discriminator could be configured to analyze a light pulse as a function of wavelength and to apply a pulse-shape discrimination algorithm to identify each pulse as either a non-neutron pulse or a neutron pulse based upon the wavelength of the pulse. Computational circuitry 104 could be configured to identify neutrons and discard pulses resulting from gamma rays or to detect both neutrons and gamma rays. Analysis may also incorporate one or more signal analysis algorithms in an application-specific integrated circuit ("ASIC"), a field-programmable gate array ("FPGA"), or another similar device. For a neutron detection apparatus that is configured to detect neutrons, a counter can be incremented when a neutron is detected, and for a neutron detection apparatus that is configured to detect gamma rays, a different counter can be incremented when a gamma ray is detected.

Figure 3:
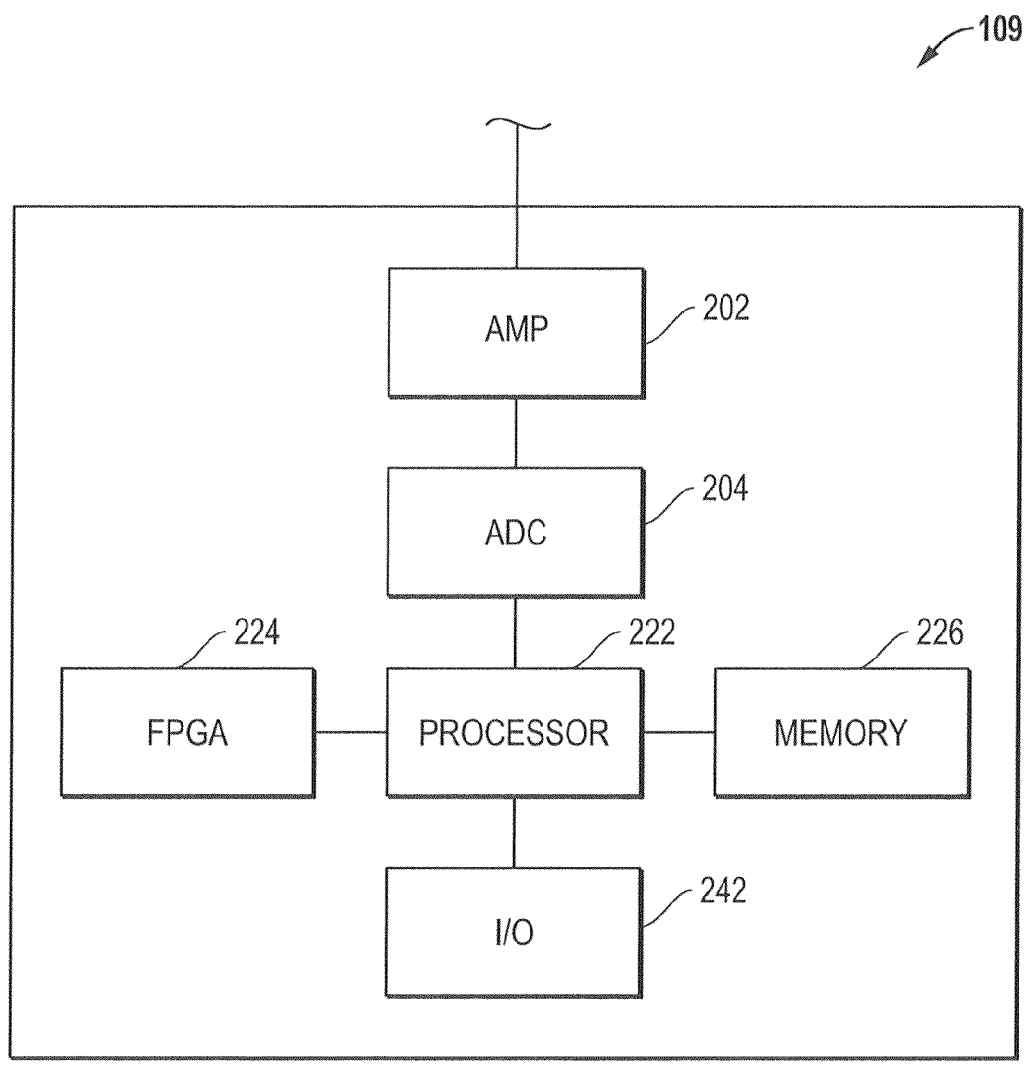
FIG. 3 is a schematic view of a portion of a control module in accordance with an embodiment.

FIG. 3 includes a schematic diagram of an illustrative, non-limiting embodiment of the computational circuitry 104. As illustrated, an amplifier 202 is coupled to an analog-to-digital converter 204, which is coupled to a processor 222. In an embodiment, the amplifier 202 can be a high fidelity amplifier. The processor 222 is coupled to a programmable/re-programmable processing module ("PRPM"), such as a field programmable gate array ("FPGA") 224 or application-specific integrated circuit ("ASIC"), a memory 226, and an input/output ("I/O") module 242. The couplings may be unidirectional or bidirectional. The functions provided by the components are discussed in more detail below. In another embodiment, more, fewer, or different components can be used in the control module 109. For example, functions provided by the FPGA 224 may be performed by the processor 222, and thus, the FPGA 224 is not required. The FPGA 224 can act on information faster than the processor 222.

Some or all of the functions described with respect to the FPGA 224 may be performed by the processor 222, and therefore, the FPGA 224 is not required in all embodiments. Further, the FPGA 224, the memory 226, the I/O module 242, or any combination thereof may be within the same integrated circuit, such as the processor 222. In another embodiment, the computational circuitry 104 does not need to be housed within the neutron detection apparatus 100.

The program environment in which one embodiment of the invention may be executed can further incorporate one or more general-purpose computers or special-purpose devices such hand-held computers. Details of such devices (e.g., processor, memory, data storage, and input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

The present invention has broad applicability and can provide many benefits as described and shown in the examples above. The embodiments will vary greatly depending upon the specific application, and not every embodiment will provide all of the benefits and meet all of the objectives that are achievable by embodiments of the invention. Note that not all of the activities described above in the general description or the examples are required, that a portion of a specific activity may not be required, and that one or more further activities may be performed in addition to those described. Still further, the order in which activities are listed are not necessarily the order in which they are performed.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A scintillator comprising:
 a plastic matrix; and
 a first scintillation material including metal-free organic luminescent compound in which excited triplet states are promoted into excited singlet states by thermal energy and wherein the excited singlet states generates luminescence at a first wavelength when the excited singlet states decay to ground state,
 wherein the plastic matrix is doped with molecules of the first scintillation material, the plastic matrix comprises a plastic transparent to light of the first wavelength, and wherein the first scintillation material has an internal fluorescence efficiency that is greater than 25%.

Item 2. The scintillator of item 1, wherein the first scintillation material has an energy gap ($\Delta E_{ST}$) between the excited triplet state ($T_1$) and the excited singlet state ($S_1$) than is no more than about 600 meV, no more than about 500 meV, no more than about 400 meV, no more than about 300 meV, no more than about 200 meV, or no more than about 100 meV.

Item 3. A neutron radiation detection apparatus comprising:
 a scintillator configured to produce light in response to capturing neutron and non-neutron radiation, the scintillator including:
  a plastic matrix; and
  a first scintillation material including a metal-free organic luminescent compound, wherein excited triplet states are promoted into excited singlet states by thermal energy and wherein the excited singlet states generate luminescence at a first wavelength when the excited singlet states decay to ground state,
  wherein molecules of the first scintillation material are dispersed within the plastic matrix, the plastic matrix comprises a plastic material that is transparent to light of the first wavelength, and the first scintillation material has an energy gap ($\Delta E_{ST}$) between the excited triplet state ($T_1$) and the excited singlet state ($S_1$) than is no more than about 600 meV, no more than about 500 meV, no more than about 400 meV, no more than about 300 meV, no more than about 200 meV, or no more than about 100 meV; and
 a photosensor optically coupled to the scintillator and operative to convert photons emitted by the scintillator into an electronic signal pulse.

Item 4. The neutron radiation detection apparatus of item 3, further comprising a pulse-shape discriminator to process an electronic signal pulse to identify the pulse as either a non-neutron pulse or a neutron pulse.

Item 5. The neutron radiation detection apparatus of item 4, wherein the pulse-shape discriminator is configured to apply a pulse-shape discrimination algorithm, the pulse-shape discrimination algorithm being capable of identifying each pulse as either a non-neutron pulse or a neutron pulse based upon the decay time of the pulse.

Item 6. The neutron radiation detection apparatus of item 4, wherein the pulse-shape discriminator is configured to analyze a pulse shape of the electronic signal pulse comprising pulse amplitude as a function of time.

Item 7. The neutron radiation detection apparatus of any one of items 3-6, wherein neutron radiation comprises energetic neutrons and/or heavy charged particles from neutron reactions.

Item 8. The neutron radiation detection apparatus of any one of items 3-7, wherein the non-neutron radiation comprises gamma radiation.

Item 9. The neutron radiation detection apparatus of item 8, wherein the pulse-shape discriminator is configured to analyze a pulse shape of the electronic signal pulse to discriminate between gamma interactions and neutron interactions.

Item 10. The neutron radiation detection apparatus of item 9, wherein analyzing a pulse shape of the electronic signal pulse to discriminate between gamma interactions and neutron interactions comprises analyzing a pulse shape of the electronic signal pulse to discriminate between gamma interactions and neutron interactions so that the fraction of gamma ray pulses erroneously counted as a neutron pulse is no more than one per million.

Item 11. The neutron radiation detection apparatus of any one of items 3-10, wherein the photosensor comprises at least one of a photomultiplier tube, a hybrid photomultiplier, or a photodiode.

Item 12. The neutron radiation detection apparatus of any one of items 3-11 further comprising a light pipe disposed between the scintillator and the photosensor.

Item 13. The scintillator or the neutron radiation detection apparatus of any one of the preceding items, wherein the first scintillation material comprises a fluorescent compound having one or more carbazole moieties that can act as a donor chromophore.

Item 14. The scintillator or the neutron radiation detection apparatus of any one of the preceding items, wherein the first scintillation material comprises indolocarbazole or plenylindolocarbazole.

Item 15. The scintillator or the neutron radiation detection apparatus of any one of the preceding items, wherein the first scintillation material comprises a heteroatom substituted carbazole, dibenzothiophene, diphenylsulfone, or phenoxazine.

Item 16. The scintillator or the neutron radiation detection apparatus of any one of the preceding items, wherein the first scintillation material comprises a fluorescent compound having dicyanobenzene that can act as an acceptor chromophore.

Item 17. The scintillator or the neutron radiation detection apparatus of any one of the preceding items, wherein the first scintillation material comprises a fluorescent compound having triazine that can act as an acceptor chromophore.

Item 18. The scintillator or the neutron radiation detection apparatus of any one of the preceding items, wherein the first scintillation material comprises a carbazolyl dicyanobenzene.

Item 19. The scintillator or the neutron radiation detection apparatus of any one of the preceding items, wherein the internal fluorescence efficiency of the first scintillation material is greater than 30%, greater than 50%, greater than 75%, greater than 80%, greater than 85%, or greater than 90%.

Item 20. The scintillator or the neutron radiation detection apparatus of any one of the preceding items, further comprising a second scintillation material for detecting thermal neutrons.

Item 21. The scintillator or the neutron radiation detection apparatus of any one of the preceding items, further including a second scintillation material for detecting thermal neutrons, the second scintillation material comprising $^6$Li or $^{10}$B.

Item 22. The scintillator or the neutron radiation detection apparatus of any one of the preceding items, further comprising a second scintillation material for detecting thermal neutrons, wherein the first scintillation material and/or the second scintillation material are suspended in a plastic matrix.

Item 23. The scintillator or the neutron radiation detection apparatus of any one of the preceding items, wherein the plastic matrix is a solid polymer matrix.

Item 24. The scintillator or the neutron radiation detection apparatus of any one of the preceding items, wherein the plastic matrix comprises styrene, vinyl toluene, and/or methyl methacrylate.

Item 25. A scintillator comprising:
a plastic matrix; and
a first scintillation material comprising a carbazolyl dicyanobenzene.

Item 26. The scintillator of item 25, wherein the carbazolyl dicyanobenzene includes one or more carbazole moieties that can act as a donor luminophore.

Item 27. The scintillator of item 25, wherein the carbazolyl dicyanobenzene comprises a dicyanobenzene moiety that can act as an acceptor luminophore.

Item 28. The scintillator of item 25, further comprising a second scintillation material for detecting thermal neutrons.

Item 29. The scintillator of item 28, wherein the second scintillation material comprises $^6$Li or $^{10}$B.

Item 30. The scintillator of item 28, wherein the first scintillation material and/or the second scintillation material is suspended in a solid polymer matrix.

Item 31. The scintillator of item 30, wherein the plastic matrix comprises styrene, vinyl toluene, and/or methyl methacrylate.

Item 32. A method of detecting neutrons, the method comprising:
exposing a detection device to a source of radiation, the detection device comprising:
a scintillator configured to produce light in response to capturing neutron and non-neutron radiation, the scintillator including:
a first scintillation material including a metal-free organic luminescent compound in which excited triplet states are promoted into excited singlet states by thermal energy, wherein the excited singlet states generate luminescence at a first wavelength when the excited singlet states decay to ground state, and wherein the energy gap ($\Delta E_{ST}$) between the excited triplet state ($T_1$) and the excited singlet state ($S_1$) than is no more than about 600 meV, no more than about 500 meV, no more than about 400 meV, no more than about 300 meV, no more than about 200 meV, or no more than about 100 meV; and
a plastic matrix doped with molecules of the first scintillation material, the plastic matrix comprising a plastic material that is transparent to light of the first wavelength; and
a photosensor optically coupled to the scintillator and operative to convert photons emitted by the scintillator into an electronic signal pulse;
receiving an electronic signal pulse from the detection device at a computational device; and
determining with the computational device an amount of the neutron radiation based on the electronic signal pulse.

Item 33. The method of item 32, further comprising analyzing the electronic signal pulse to identify counts associated with neutron events, the amount of neutron radiation being associated with the identified counts.

Item 34. The method of item 33, wherein analyzing the electronic signal pulse to identify counts associated with neutron events includes performing pulse shape discrimination.

Item 35. The method of any one of items 32-34, wherein the first scintillation material comprises a fluorescent compound having carbazole as a donor chromophore.

Item 36. The method of any one of items 32-35, wherein the first scintillation material comprises a fluorescent compound having dicyanobenzene as an acceptor chromophore.

Item 37. The method of any one of items 32-36, wherein the first scintillation material comprises a carbazolyl dicyanobenzene.

Item 38. The method of any one of items 32-37, wherein the internal fluorescence efficiency of the first scintillation material is greater than 25%, greater than 30%, greater than 50%, greater than 75%, greater than 80%, greater than 85%, or greater than 90%.

Item 39. The method of any one of items 32-38, wherein the scintillator further comprises a second scintillation material for detecting thermal neutrons.

Item 40. The method of item 39, wherein the second scintillation material comprises $^6$Li or $^{10}$B.

Item 41. The method of item 39, wherein the first scintillation material and/or the second scintillation material are suspended in a plastic matrix.

Item 42. The method of any one of items 32-41, wherein the plastic matrix is a solid polymer matrix Item 43. The method of any one of items 32-41, wherein the plastic matrix comprises styrene, vinyl toluene, and/or methyl methacrylate.

Item 44. The method of any one of items 32-41, wherein neutron radiation comprises energetic neutrons and/or heavy charged particles from neutron reactions.

Item 45. The method of any one of items 32-44, wherein the non-neutron radiation comprises gamma radiation.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A scintillator comprising:
a plastic matrix; and
a first neutron-sensing material including metal-free organic luminescent compound in which excited triplet states are promoted into excited singlet states by thermal energy and wherein the excited singlet states generates luminescence at a first wavelength when the excited singlet states decay to ground state,
wherein the plastic matrix is doped with molecules of the first neutron-sensing material of the scintillator, the plastic matrix comprises a plastic transparent to light of the first wavelength, and wherein the first neutron-sensing material has an internal fluorescence efficiency that is greater than 25%.

2. The scintillator of claim 1, wherein the first neutron-sensing material has an energy gap ($\Delta E_{ST}$) between the excited triplet state ($T_1$) and the excited singlet state ($S_1$) than is no more than about 600 meV.

3. The scintillator of claim 1, wherein the first neutron-sensing material comprises a fluorescent compound having one or more carbazole moieties that can act as a donor chromophore.

4. The scintillator of claim 1, wherein the first neutron-sensing material comprises indolocarbazole, plenylindolocarbazole, or a heteroatom substituted carbazole, dibenzothiophene, diphenylsulfone, or phenoxazine.

5. The scintillator of claim 1, wherein the first neutron-sensing material comprises a fluorescent compound having dicyanobenzene that can act as an acceptor chromophore, or triazine that can act as an acceptor chromophore.

6. The scintillator of claim 1, wherein the first neutron-sensing material comprises a carbazolyl dicyanobenzene.

7. The scintillator of claim 1, wherein the internal fluorescence efficiency of the first neutron-sensing material is greater than 30%.

8. The scintillator of claim 1, further comprising a second neutron-sensing material for detecting thermal neutrons.

9. The scintillator of claim 1, further comprising a second neutron-sensing material for detecting thermal neutrons, wherein the first neutron-sensing material and/or the second neutron-sensing material are suspended in a plastic matrix.

10. A neutron radiation detection apparatus comprising:
a scintillator configured to produce light in response to capturing neutron and non-neutron radiation, the scintillator including:
a plastic matrix; and
a first neutron-sensing material including a metal-free organic luminescent compound, wherein excited triplet states are promoted into excited singlet states by thermal energy and wherein the excited singlet states generate luminescence at a first wavelength when the excited singlet states decay to ground state, wherein molecules of the first neutron-sensing material are dispersed within the plastic matrix, the plastic matrix comprises a plastic material that is transparent to light of the first wavelength, and the first neutron-sensing material has an energy gap ($\Delta E_{ST}$) between the excited triplet state ($T_1$) and the excited singlet state ($S_1$) than is no more than about 600 meV; and a photosensor optically coupled to the scintillator and operative to convert photons emitted by the scintillator into an electronic signal pulse.

11. The neutron radiation detection apparatus of claim 10, further comprising a pulse-shape discriminator to process an electronic signal pulse to identify the pulse as either a non-neutron pulse or a neutron pulse.

12. The neutron radiation detection apparatus of claim 11, wherein the pulse-shape discriminator is configured to apply a pulse-shape discrimination algorithm, the pulse-shape discrimination algorithm being capable of identifying each pulse as either a non-neutron pulse or a neutron pulse based upon the decay time of the pulse.

13. The neutron radiation detection apparatus of claim 11, wherein the pulse-shape discriminator is configured to analyze a pulse shape of the electronic signal pulse comprising pulse amplitude as a function of time.

14. The neutron radiation detection apparatus of claim 10, wherein neutron radiation comprises energetic neutrons and/or heavy charged particles from neutron reactions.

15. The neutron radiation detection apparatus of claim 14, wherein the non-neutron radiation comprises gamma radiation, and the pulse-shape discriminator is configured to analyze a pulse shape of the electronic signal pulse to discriminate between gamma interactions and neutron interactions.

16. The neutron radiation detection apparatus of claim 15, wherein analyzing a pulse shape of the electronic signal pulse to discriminate between gamma interactions and neutron interactions comprises analyzing a pulse shape of the electronic signal pulse to discriminate between gamma interactions and neutron interactions so that the fraction of gamma ray pulses erroneously counted as a neutron pulse is no more than one per million.

17. A method of detecting neutrons, the method comprising:

exposing a detection device to a source of radiation, the detection device comprising:

a scintillator configured to produce light in response to capturing neutron and non-neutron radiation, the scintillator including:

a first neutron-sensing material including a metal-free organic luminescent compound in which excited triplet states are promoted into excited singlet states by thermal energy, wherein the excited singlet states generate luminescence at a first wavelength when the excited singlet states decay to ground state, and wherein the energy gap ($\Delta E_{ST}$) between the excited triplet state ($T_1$) and the excited singlet state ($S_1$) than is no more than about 600 me V; and a plastic matrix doped with molecules of the first neutron-sensing material, the plastic matrix comprising a plastic material that is transparent to light of the first wavelength; and a photosensor optically coupled to the scintillator and operative to convert photons emitted by the scintillator into an electronic signal pulse;

receiving an electronic signal pulse from the detection device at a computational device; and determining with the computational device an amount of the neutron radiation based on the electronic signal pulse.

18. The method of claim 17, wherein the first neutron-sensing material comprises a carbazolyl dicyanobenzene.

19. The method of claim 17, wherein the internal fluorescence efficiency of the first neutron-sensing material is greater than 25%.

20. The method of claim 17, wherein the scintillator further comprises a second neutron-sensing material for detecting thermal neutrons.

\* \* \* \* \*